United States Patent Office 2,878,294
Patented Mar. 17, 1959

2,878,294

POLYMERIC ACETALS

Bernard H. Kress, Lafayette Hill, Pa., assignor to Quaker Chemical Products Corporation, Conshohocken, Pa., a corporation of Pennsylvania No Drawing. Application December 3, 1956
Serial No. 625,632

3 Claims. (Cl. 260—615)

This invention relates to polymeric acetals. More specifically, it relates to acetal condensation products of polyhydric alcohols with an aldehyde and a monohydric alcohol containing from 1 to 35 carbon atoms. In particular, it relates to polyacetals derived from dialkylene and polyalkylene glycols and aliphatic aldehydes modified with aliphatic alcohols containing from 1 to 35 carbon atoms. The preferred embodiment of this invention is to be found in polyformals prepared by the condensation of formaldehyde, or of compounds capable of generating formaldehyde such as paraformaldehyde, trioxane or methylal with a diglycol or a polyglycol derived from a vicinal alkylene glycol in which the alkylene radical contains from 2 to 4 carbon atoms in a straight chain and a monohydric alcohol of the aliphatic series containing from 1 to 18 carbon atoms. Among other characteristics, many of these polyformals and other polyacetals of this invention possess excellent surface active properties. By varying the specific nature of the intermediates, alcohol-modified polyformals may be obtained which are particularly useful as wetting agents. Other compounds of this class have exceptional emulsifying properties or detergent characteristics. Still other members of this series have excellent dimensional stabilizing properties when reacted by catalytic means with cellulosic materials such as regenerated cellulose, cotton or paper. The products of my invention also find other valuable applications in textile, leather, metal, and paper technologies. Other uses of the products of this invention will be apparent from the following description.

This application is a continuation-in-part of my copending applications Serial Nos. 403,056 and 403,057, both filed on January 8, 1954, now Patents 2,786,081, March 19, 1957, and 2,785,949, March 19, 1957, and of my copending application, Serial No. 587,974, filed May 29, 1956, now abandoned.

In my copending application, Serial No. 403,056, I have shown that useful condensation products may be obtained by reaction between dialkylene glycols and aldehydes and in my copending application, Serial No. 403,057, I have described the use of these polymeric acetals and of a variety of other polymeric acetals derived from other polyglycols with or without conjoint derivation from polyhydric alcohols containing from 3 to 6 hydroxyl groups per molecule of polyol in the dimensional stabilization of cellulosic fabrics. In my copending application, Serial No. 508,318, now Patent 2,785,995, March 19, 1957, I have also described the application of similar polymeric acetals in the dimensional stabilization of paper and regenerated cellulose films and for imparting wet strength thereto. I have now found that valuable modifications of polyacetals as disclosed in the aforementioned applications can be obtained by introducing into their structure radicals derived from aliphatic monohydric alcohols, cyclic alcohols, both carbocyclic and heterocyclic, alkyl-, aryl-, alkaryl-, aralkyl, and alkaralkyl-monoethers of glycols as well as partial ethers and acetals of polyols containing residual hydroxyl groups.

The monohydric alcohols of the aforementioned types modify the acetal condensation products of polyalkylene glycols and the like by reaction to yield a terminal alkyl group. When, for example, monohydric alcohols are reacted with diethylene glycol and formaldehyde, the modified acetals which are the products of this invention contain the following group as their hydrophilic component

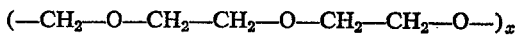

$(-CH_2-O-CH_2-CH_2-O-CH_2-CH_2-O-)_x$ where $x$ is an integer between 1 and 100.

The monohydric alcohols just enumerated may be reacted in various proportions by weight up to about 75 percent, depending on the chemical composition desired, the molecular weight and the properties sought. The preferred polyacetals of this invention contain monohydric alcohol residues in proportions up to equimolar amounts of the glycol residues therein.

The compositions of this invention may be prepared by any convenient method and my invention is therefore not restricted thereby. I prefer to employ one of the following three procedures.

A. Simultaneous reaction of the monohydric alcohol, polyhydric alcohol and aldehyde.

B. Reaction of the monohydric alcohol with a preformed polyacetal derived from a polyhydric alcohol and aldehyde.

C. Reaction according to either A or B using a partial ether of a monohydric alcohol and a polyhydric alcohol.

By any one of these procedures, the reaction is readily carried out without use of an excess of aldehyde and the products thus obtained are, for all practical purposes, free of aldehyde. I have found, for example, that acetalization carried out as described in the following examples yields products free of obnoxious formaldehyde odor which show only a fraction of one percent of uncombined formaldehyde as determined by chemical analysis.

The following examples will serve to illustrate the nature of the condensation products of my invention. The parts are given by weight in all examples.

PREPARATION ACCORDING TO METHOD A

Illustrations of the first method of preparation of the compounds of this invention are shown in Examples 1 to 16.

Example 1

| | Parts |
|---|---|
| 2-ethyl hexanol | 65 |
| Diethylene glycol | 212 |
| Paraformaldehyde (91%) | 74.3 |
| Toluene | 40.0 |
| p.Toluene sulfonic acid | 0.2 | are mixed in a flask and refluxed, using a moisture trap, until 48 parts of water are recovered in the trap. The toluene is evaporated in vacuo and a straw-colored syrup remains. This product is readily dispersible in water and may be used as a coupler for hydrocarbons and water. For example, 10 parts of water and 8 parts of toluene can be coupled to a clear homogeneous liquid by means of 2 parts of the product of this example.

Various other azeotroping liquids may be used instead of toluene such as benzene, xylene, aliphatic hydrocarbons and, in some cases, even excess alcohols if the same are not water-compatible. In forming the condensation products, it is necessary to have an acidic catalyst present, such as sulfuric acid, alkane sulfonic acids, phosphoric acids, and acid metallic halides, such as zinc chloride, stannic chloride, aluminum chloride, acid clays, etc. In general, those catalysts well-known to the art for alkylation, esterification and Friedel-Crafts condensation reactions may be employed in making the condensation products.

Aliphatic alcohols of chain length from 1 to 35 carbon atoms are used in making the condensation products of this invention, including such compounds as methanol, ethanol, the propanols, butanols, pentanols, hexanols, nonyl alcohol, decyl alcohol, lauryl alcohol, myristyl alcohol, cetyl alcohol, stearyl alcohol, ceryl alcohol, behenyl alcohol, myricyl alcohol, and gossypyl alcohol. Likewise, branched chain alcohols, such as 7-ethyl-2-methyl undecanol-4 and oxo process alcohols may be used. I may also use unsaturated aliphatic alcohols, such as allyl alcohol, propargyl alcohol, oleyl alcohol, crotyl alcohol lineolyl alcohol and the like. Hydroxy fatty alcohols, such as 12 hydroxyl stearyl alcohol, ricinoleyl alcohol, the hydroxy alcohols derived by reduction of dimerized linoleic acid (such as "dimer acids" manufactured by Emery Industries, Inc., Cincinnati, Ohio) may also be used. The alcohols employed may also contain substituent halogen, nitro, or nitrile groups, for example chlorobutanol, nitropropanol, ethylene cyanohydrin, ethylene chlorohydrin, dichlorostearyl alcohol, and 10,11-dichlor undecanol. Epoxy derivatives of unsaturated alcohols may also be utilized in the products of this invention. I may also use carbocyclic alcohols such as cyclohexanol, cyclopentanol, cyclohexylethanol, benzylalcohol, cyclobutanol, fenchyl alcohol, nopol, cholesterol, and the like. I may also use heterocyclic monohydric alcohols, such as furfuryl alcohol, tetrahydrofurfuryl alcohol, thienylethyl alcohol, and the like. I may also use mercaptans for the purposes of this invention instead of alcohols. Thus, instead of utilizing cetyl alcohol or ethanol, I may employ cetyl mercaptan or ethyl mercaptan, respectively. The substituted products of the lower aliphatic alcohols containing less than 10 carbon atoms are in general useful as solvents, couplers and cellulose reactants. The products derived from alcohols containing 10 carbons or more are useful as detergents, wetting agents, and for other surface active purposes.

Formaldehyde may be employed in any of its forms in making these products. I may, for example, use formalin, paraformaldehyde, trioxane, or methylal. Other mono- and di-aldehydes containing up to 8 carbon atoms can be used. As examples of such aldehydes I include acetyldehyde, propionaldehyde, butyraldehyde, heptaldehyde, 2-ethyl hexaldehyde, glyoxal, malonaldehyde, succinaldehyde, glutaraldehyde, hydroxyadipaldehyde or compounds capable of generating these aldehydes under acidic conditions. Aromatic and other carbocyclic aldehydes may also be used, such as benzaldehyde, terephthaldehyde, and tetrahydrobenzaldehyde. I may also employ heterocyclic aldehydes, such as furfural, methyl furfural, ethyl furfural, thiophene aldehyde and the like. In general, therefore, I may use any reactive aliphatic, carbocyclic or heterocyclic aldehyde containing from 1 to 8 carbon atoms in monomeric form. Substituted aldehydes, such as chloroacetaldehyde, hydroxy pivalaldehyde and similar halogen and hydroxy substituted aldehydes may be used.

Instead of an aldehyde per se I may use derivatives, polymers, and precursors thereof, such as 2-formyl-3,4-dihydro-2H-pyran; 2-alkoxy-3,4-dihydro-2H-pyran; dialkoxy tetrahydrofuran and the like.

In general, I may use any polyalkylene glycol including dialkylene glycols derived from a simple glycol containing an alkylene radical possessing from 2 to 4 carbon atoms in a straight chain. I may, for example, employ diethylene glycol, dipropylene glycols, dibutylene glycols, triethylene glycol, and other higher polyethylene, polypropylene and polybutylene glycols and mixed polyethylene-propylene glycols. I may also use di-trimethylene glycol and its analogs.

If desired, I may employ thiodiglycol instead of diethylene glycol, or other polythioglycol instead of the corresponding oxygen-containing polyglycol. I may also use bis-2-hydroxy-ethyl sulfone.

In order to prepare the products of my invention, it is necessary, as just indicated, to use a polyalkylene glycol containing at least 2 glycol units, such as diethylene glycol, triethylene glycol, dipropylene glycol, tetrapropylene glycol, decaethylene glycol and the like. Because of the extremely low yields obtained it is not feasible, for example, to prepare products starting with ethylene glycol itself. When such simple glycols are employed the principal reaction is formation of dioxolane,

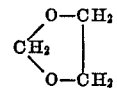

or a homolog thereof. Formals containing an alkyl radical derived from conjoint use of a monohydric alcohol are formed only in minute quantity, or not at all, when such simple glycols are employed. When, for example, 31 gms. of lauryl alcohol, 64 gms. of ethylene glycol, 36 gms. of paraformaldehyde, and 0.1 gm. of paratoluene sulfonic acid were refluxed under azeotropic distillation conditions with toluene, only 9 gms. of water-extractable material was found in the non-volatile residue after removal of 31 gms. of aqueous distillate and this product in 0.2% concentration showed a wetting time of over 200 seconds by Draves test according to the American Association of Textile Chemists and Colorists Yearbook 29, pp. 156–7 (1953).

*Example 2*

|  | Parts |
|---|---|
| n-Amyl alcohol | 17.6 |
| Diethylene glycol | 106 |
| Paraformaldehyde (91%) | 36.3 |
| p.Toluene sulfonic acid | 0.2 |
| Toluene | 40 | are heated under reflux using a Dean and Stark trap to remove 25 part of water of reaction. After stripping off the toluene in vacuo, a straw-colored liquid remains which is water-dispersible to yield an aqueous solution exhibiting a slight opalescence. This product is useful in treating cellulosic materials for dimensional control as shown in Example 24.

*Example 3*

|  | Parts |
|---|---|
| Laurly alcohol | 63 |
| Diethylene glycol | 212 |
| Paraformaldehyde (91%) | 77 |
| Toluene | 35 |
| p.Toluene sulfonic acid | 0.2 |

The above materials are mixed together and heated under reflux, using a Dean and Stark moisture trap, until 42 parts of water of reaction are removed. The toluene is then evaporated in vacuo, leaving a product which is a clear mobile liquid when hot and which forms a pasty fluid when cool. Gas sparging, vacuum distillation or azeotropic distillation is useful in preparing this material which is readily dispersible in water. The product of this example is an excellent surfacetant for use in the preparation of aqueous emulsions of petroleum hydrocarbons.

Instead of lauryl alcohol in the foregoing Example 3, I may use 49 parts by weight of nonyl alcohol to produce a water-soluble condensation product which may also be used to couple hydrocarbons into aqueous systems.

Fatty alcohols of higher chain lengths and of branched chains may also be used as illustrated in the following examples:

*Example 4*

| | Parts |
|---|---|
| Stearyl alcohol | 90 |
| Diethylene glycol | 212 |
| Paraformaldehyde (91%) | 77 |
| Toluene | 35 |
| p.Toluene sulfonic acid | 0.2 |

This mixture is treated as in Example 3 and after toluene is evaporated a smooth, low melting, off-white paste is obtained which is completely water-dispersible. This product is useful as a textile softener as described in Example 26.

*Example 5*

| | Parts |
|---|---|
| Tridecyl alcohol (oxo process) | 100 |
| Diethylene glycol | 530 |
| Paraformaldehyde (91%) | 165 |
| Toluene | 35 |
| p.Toluene sulfonic acid | 0.1 |

The above components are reacted as in Example 3. The liquid product is water-soluble and useful as a detergent as shown in Table III, and as a softener as shown in Example 26.

Heterocyclic alcohols may also be used in preparing the modified polyacetal condensation products of this invention as shown in the following example:

*Example 6*

| | Parts |
|---|---|
| Tetrahydrofurfuryl alcohol | 101 |
| Diethylene glycol | 424 |
| Paraformaldehyde (91%) | 149 |
| Toluene | 40 |
| p.Toluene sulfonic acid | 0.25 |

The above components were reacted as in Example 1 to yield a light-yellow water soluble liquid useful in dimensional control of cellulose fabrics in the same manner as shown in Example 23.

Olefinic alcohols, such as allyl, crotyl, and oleyl alcohols, linoleyl alcohol, 10-undecene-1-ol, and the like may also be used, as in the following example:

*Example 7*

| | Parts |
|---|---|
| Oleyl alcohol | 26.8 |
| Diethylene glycol | 63.6 |
| Paraformaldehyde (91%) | 30 |
| p.Toluene sulfonic acid | 0.2 |

The above components were treated as in Example 3. After the theoretical amount of water of reaction was removed, a dark brown liquid was obtained which was useful as an emulsifier for hydrocarbons, for example, 1 part of this product will emulsify 4 parts of xylyol in 10 parts of water.

Acetylenic alcohols may also be used in these reactions as shown in the following example:

*Example 8*

| | Parts |
|---|---|
| Propargyl alcohol | 56 |
| Diethylene glycol | 212 |
| Paraformaldehyde (91%) | 72.5 |
| Toluene | 25 |
| p.Toluene sulfonic acid | 0.2 | are heated under reflux with a Dean and Stark trap to remove water of reaction. After all water of reaction is removed by azeotroping with toluene the hydrocarbon is evaporated in vacuo and a clear, water soluble light yellow liquid remains such is useful in textile treatment in order to stabilize cellulose fabrics dimensionally in the same manner as shown in Example 24.

Instead of propargyl alcohol in the preceding example, I may employ 70 parts of a butynol or 168 parts of 10-undecene-1-ol.

The preceding examples have shown the use of diethylene glycol as component of the polyacetals of this invention. Higher polyethylene glycols, other dialkylene glycols and polyglycols and mixtures thereof may be used to prepare the polyacetals of my invention as shown in Examples 9–11.

*Example 9*

| | Parts |
|---|---|
| Tridecyl alcohol | 20 |
| Polyethylene glycol average mol. weight 200 | 100 |
| Paraformaldehyde (91%) | 18.2 |
| Toluene | 30 |
| p.Toluene sulfonic acid | 0.25 |

The above mixture was heated under reflux with a Dean and Stark trap until 12 parts of water were removed. Toluene was then evaporated in vacuo to leave a pale straw-colored liquid which dispersed readily in water. It is useful as an excellent emulsifier for water and water-immiscible liquids such as toluene and carbon disulfide.

*Example 10*

| | Parts |
|---|---|
| 2-butyl octanol-1 | 63 |
| Diethylene glycol | 212 |
| Dipropylene glycol | 43 |
| Paraformaldehyde (91%) | 88 |
| Toluene | 35 |

The above components were reacted as in Example 3. The reaction was complete when 48 parts of water of reaction were obtained. The viscous liquid remaining behind was readily dispersible in water. The product is useful in treatment of cellulosic fabrics for dimensional control in the same manner as shown in Example 24.

*Example 11*

| | Parts |
|---|---|
| Tridecyl alcohol (oxo process) | 100 |
| Dipropylene glycol | 151 |
| Diethylene glycol | 362 |
| Paraformaldehyde (91%) | 164.5 |
| Toluene | 40 |
| p.Toluene sulfonic acid | 0.8 |

The above materials are processed as in Example 3 and a straw-colored, water-dispersible liquid is obtained which is useful as an emulsifying agent as shown in Example 25 and Table II.

Condensation products of dialkylene or polyalkylene glycols and formaldehyde which are modified by use of monohydric alcohols may also be modified further with polyhydric alcohols containing from 3 to 6 hydroxyl groups and from 3 to 10 carbon atoms, such as glycerine, trimethylolethane, trimethylolpropane, butane, triol, hexanetriol, alpha-methyl glucoside, erythritol, pentaerythritol, sorbitol, mannitol, dipentaerythritol, etc. In general, these polyhydric alcohols may be used in amounts up to equimolar amounts of the glycols.

*Example 12*

| | Parts |
|---|---|
| Pentaerythritol | 14 |
| Tetradecanol | 22 |
| Diethylene glycol | 85 |
| Paraformaldehyde (91%) | 33 |
| Toluene | 35 |
| p.Toluene sulfonic acid | 0.2 |

The above components were refluxed, using a Dean and Stark trap, until 18 parts of water of reaction were separated. After toluene was evaporated in vacuo a water-dispersible liquid was obtained which was useful as a dispersing agent and dye levelling agent as described hereinafter.

I am not limited to the use of formaldehyde in making the modified polyacetals of the invention. Other aldehydes may also be employed as shown by the following Examples 13 and 14:

*Example 13*

| | Parts |
|---|---|
| Tridecyl alcohol | 20 |
| Diethylene glycol | 106 |
| Butyraldehyde | 76 |
| Toluene | 30 |
| p.Toluene sulfonic acid | 0.2 |

These materials were heated under reflux using a Dean and Stark trap. After 18 parts of water had been removed, toluene was evaporated leaving a brown liquid which was useful in dispersing water in 100 viscosity pariffinic mineral oil.

*Example 14*

| | Parts |
|---|---|
| Tridecyl alcohol | 20 |
| Diethylene glycol | 106 |
| 2-ethyl hexaldehyde | 136.5 |
| Toluene | 30 |
| p.Toluene sulfonic acid | 0.1 |

These materials were also reacted as in the previous example. After removal of toluene, a light tan liquid remained which was completely soluble in mineral oil and which served as an excellent coupling agent for the preparation of clear solutions of ethanol in 100 viscosity paraffinic mineral oil.

Instead of using monofunctional aldehydes, or in addition thereto, I may also use dialdehydes as shown below.

*Example 15*

| | Parts |
|---|---|
| Tridecyl alcohol | 20 |
| Diethylene glycol | 106 |
| Glutaraldehyde (30%) aqueous solution | 175 |
| Toluene | 30 |
| p.Toluene sulfonic acid | 0.2 |

These chemicals were reacted as in Example 13. After 137 parts of water had been removed a viscous dark liquid remained which could be set by heating to a soft rubbery mass useful as an adhesive.

*Example 16*

In this example, 72 parts of 50% aqueous solution of hydroxy adipaldehyde were used in place of glutaraldehyde in the previous example. After 51 parts of water were removed and toluene evaporated, a dark viscous liquid was obtained which was compatible with mineral oil and which permitted water to be emulsified in oil.

Instead of hydroxyadipaldehyde, 55 parts of hydroxy pivalaldehyde may be employed to produce a product having similar properties.

PREPARATION ACCORDING TO METHOD B

Products similar to those shown in Examples 1 to 16 may also be prepared from the same intermediates according to the second general method hereinbefore described. That is to say, the diethylene glycol or other polyglycol, with or without another modifying polyglycol or other polyhydric alcohol, may first be reacted with the aldehyde to yield a polymeric acetal by refluxing under azeotropic conditions with a suitable acidic catalyst, such as p-toluene sulfonic acid, and toluene. After removal of the amount of water calculated to yield the polyacetal, the modifying monohydric component is added along with or without the addition of more formaldehyde or paraformaldehyde. Additional water is then removed azeotropically in order to complete the condensation of the alcohol and polyacetals. After neutralization and evaporation of the toluene the products is obtained as the undistilled residue. The following is an example of such a preparation.

*Example 17*

| | Parts |
|---|---|
| Diethylene glycol | 106 |
| Paraformaldehyde (91%) | 33 |
| p.Toluene sulfonic acid | 0.2 |
| Toluene | 30 |

These components are refluxed azeotropically and 20 parts of water are removed.

To this solution still containing toluene are added 32.5 parts of 2-ethyl hexanol and 4 parts of paraformaldehyde. Another 2.5 parts of water are then further removed azeotropically and the reaction mixture is neutralized. The toluene is evaporated leaving a clear yellow somewhat viscous liquid useful in the same manner as the product of Example 1. It is also useful as a defoaming agent for wax emulsions.

PREPARATION ACCORDING TO METHOD C

If desired, the polyacetals of my invention may also be prepared by utilizing as an intermediate a half-ether of an alcohol and a glycol, dialkylene glycol, or polyalkylene glycol. Thus, for example, I may carry out condensation among paraformaldehyde, diethylene glycol and a monoalkyl ether of ethylene glycol, 1,3-propylene glycol, diethylene glycol, 1,4-butylene glycol, or triethylene glycol and the like.

Such monoalkyl ethers may contain from 1 to 35 carbon atoms in the alkyl group and may include methyl, ethyl, propyl, butyl, amyl, hexyl, heptyl, octyl, lauryl, stearyl, pentatriacontyl, allyl, crotyl, oleyl and propargyl ethers of glycols and polyglycols. Among such compounds are included 2-methoxy-2-ethoxy-, 2-butoxy- and 2-hexyloxy-ethanol.

*Example 18*

| | Parts |
|---|---|
| Diethylene glycol | 101 |
| Beta methoxyethanol | 4 |
| Paraformaldehyde (91%) | 30 |
| Toluene | 20 |
| Sulfuric acid (99%) | 0.1 |

The above materials were reacted as in Example 1 to yield a viscous liquid possessing a faint ethereal odor and soluble in water. Its polymeric nature was shown by a Rast molecular weight determination which had a value of 637. This product is useful as an agent for dimensional stabilization of cellulosic materials, such as textile fabrics, paper, regenerated cellulose films and the like. See, for instance, Example 23.

*Example 19*

| | Parts |
|---|---|
| Monohexyl ether of ethylene glycol | 73 |
| Diethylene glycol | 159 |
| Paraformaldehyde (91%) | 58 |
| Toluene | 40 |
| p.Toluene sulfonic acid | 0.2 |

The same procedure as used in Example 8 was followed in order to prepare a yellow water insoluble liquid which was a good solvent for petroleum sludges.

The glycol ethers may include those of ethylene glycol, trimethylene glycol, diethylene glycol, di-trimethylene glycol, triethylene glycol, propylene glycol, dipropylene glycol, dibutylene glycols and the like, and polyglycols containing alkylene radicals possessing from 2 to 4 carbon atoms and molecular weights of any desired magnitude. Thus, for example, I may use the monomethyl ether of polyethylene glycol 600 or of polyethylene glycol of molecular weight 4000. As further examples, I may use methoxy-ethoxy-ethanol, ethoxy-ethoxy-ethanol, butoxy-ethoxy-ethanol and similar compounds where the alkyl group contains from 1 to 35 carbon atoms.

I may also use glycol and polyglycol ethers of phenols and of alkyl phenols. Thus, phenoxyethanol may be used to modify the acetal condensation products. Ring substituted phenol ethers may also be used such as t-amyl phenoxy ethanol, or p-octyl phenoxy ethanol, p-nonyl phenoxy ethanol, p-tetradecyl phenoxy ethanol, and the like. The aromatic ring substituent may contain from 1 to 18 carbon atoms and the phenolic component of the partial ethers may contain from 6 to 35 carbon atoms. The polyformals of my invention which possess polymeric chains terminated by means of half ethers of ethylene glycol, diethylene glycol, triethylene glycol and tetraethylene glycol and an aliphatic ring substituted phenol containing from 8 to 18 carbon atoms show excellent surface active properties and are useful as emulsifying agents, wetting agents, detergents, and coupling agents for immiscible liquids such as water and mineral oils. Instead of phenol ethers or alkyl phenol ethers, I may use phenalkyl ethers or alkyl phenalkyl ethers of glycols or polyglycols, such as phenethoxy ethanol or p-octyl phenethoxy butanol.

Examples 20 and 21 illustrate products derived from partial aromatic ethers.

*Example 20*

| | Parts |
|---|---|
| Phenoxyethoxyethanol | 36 |
| Diethylene glycol | 148 |
| Paraformaldehyde (91%) | 50 |
| Toluene | 40 |
| p.Toluene sulfonic acid | 0.2 |

These were reacted as in Example 1 until 32 parts of water were obtained in the water trap. The toluene-free liquid was an excellent solvent for petroleum hydrocarbons.

*Example 21*

| | Parts |
|---|---|
| t-Amyl phenoxyethanol | 21 |
| Diethylene glycol | 74 |
| Paraformaldehyde (91%) | 25 |
| Toluene | 25 |
| p.Toluene sulfonic acid | 0.2 |

The components were reacted as in Example 8 to yield a water-dispersible liquid useful as a coupler for water and chlorinated hydrocarbons, such as methylene chloride in the preparation of paint removers.

In place of the glycol or polyglycol ether, or in addition to it, I may also use corresponding partial ethers of another polyhydric alcohol, such ethers having at least one residual hydroxyl group of the original polyhydric alcohol uncombined. Thus, I may employ monoalkyl ethers and dialkyl ethers of glycerine such as the mono and dimethyl, diethyl, didecyl, distearyl ethers and the like, or I may employ mono or dimethoxyethoxybutoxy ethers of glycerin. I may also employ corresponding ethers of higher polyhydric alcohols containing up to 10 carbon atoms, such as pentaerythritol, trimethylol ethane, sorbitol, mannitol, dipentaerythritol and the like. The preferred embodiment of this invention, when utilizing partial ethers of glycols, polyglycols and other polyhydric alcohols, resides in the use of ethers of such polyhydric alcohols containing from 2 to 10 carbon atoms and from 2 to 6 hydroxyl groups per molecule.

Additionally, unsaturated compounds such as allyl glyceryl ether may be used. Carbocyclic compounds are also useful in preparation of these condensation products. Thus, glyceryl phenyl ether may be condensed with the polyalkylene glycol and aldehyde to yield a polyacetal.

Acetals and hemiacetals of polyhydric alcohols are also included among the alcohols which can be used in preparing modified polyacetal condensation products according to this invention.

The hemiacetal, alpha-methyl glucoside, yields a product as shown in Example 22, useful in textile finishing operations.

*Example 22*

| | Parts |
|---|---|
| Diethylene glycol | 64 |
| Alpha-methyl glucoside | 78 |
| Paraformaldehyde (91%) | 33 |
| Toluene | 40 |
| p.Toluene sulfonic acid | 0.15 |

When reacted as in Example 8, a viscous liquid was obtained.

Cyclic acetals derived from polyols containing from 3 to 10 carbon atoms and 3 to 6 hydroxyl groups and an aldehyde containing from 1 to 8 carbon atoms, as previously described, such acetals containing at least one reactive hydroxyl group, may be used in making condensation products according to this invention. Such acetals, for example, are 1,2-methylene glycerine, 1,3-methylene glycerine and benzylidine glycerine. Moreover, the corresponding ketals instead of these acetals may be used, such ketals being derived from ketones containing from 3 to 8 carbon atoms, such as acetone, methyl ethyl ketone, cyclohexanone acetophenone, and the like, and polyhydric alcohols. Specifically, I may employ isopropylidene glycerine or methyl phenyl methylene glycerine.

The modified acetals of this invention are polymeric in nature in that they have chain lengths which include two or more dialkylene or polyalkylene glycol units and two or more aldehyde units. Thus, the preparation of Example 5 gave rise to a Rast molecular weight of 600. By polymeric, I mean that my condensation products contain two or more aldehyde units and two or more polyhydric alcohol units per molecule of condensation product. Specifically, these modified polymeric acetal condensation products contain per molecule at least two polyoxyalkylene radicals derived from alkylene glycol in which the alkylene radical possesses from 2 to 4 carbon atoms in a straight chain and at least two alkylidene radicals (including the methylene group) derived from the aldehyde.

The ratio of alcohol to dialkylene glycol or polyalkylene glycol used in making the condensation products may vary over wide ranges depending on properties desired. Thus, any amount of alcohol may be used up to 75 parts by weight or up to an equimolar amount of polyalkylene glycol. The aldehyde portion, however, should be used in the ratio of 1 mole of aldehyde for each two moles of alcoholic hydroxyl. Larger weight ratios of alcohol may be used, for example, by inclusion of greater or lesser quantities of triethylene glycol or higher polyethylene glycols. Similarly, smaller weight ratios of alcohol may be used with either polyethylene or polypropylene glycols, or mixtures in order to obtain an appropriate balance of properties specifically desired for such applications as wetting agents, emulsifying agents, detergents, fiber lubricants, textile softeners, plasticizers for thermoplastic resins, fiber reactants, and anti-foaming agents.

As heretofore described, the order of addition of the intermediates may be varied. Thus, hemiformals of monohydric alcohols may be coreacted with either completely condensed products obtained from dialkylene or polyalkylene glycols and paraformaldehyde or with the dialkylene or polyalkylene glycols themselves and paraformaldehyde. Monohydric alcohols and paraformaldehyde may also be reacted in a like manner. It is also possible to obtain useful products by reaction of a monohydric alcohol with a formal condensation product of a dialkylene or polyalkylene glycol in the presence of an acid catalyst according to Method C.

Water-soluble or water-dispersible products made in accordance with this invention may also be used to stabilize cellulosic textiles by catalytic curing in accordance with the process described for polymeric acetals in my copending application Serial No. 403,057.

*Example 23*

A padding solution was made up as follows:

4.5% condensation product of Example 18
2.4% sodium bisulfate
0.6% sodium sulfate
92.5% water A light-weight rayon gabardine shirting material which had been bleached and scoured was marked with a "Sanforize Test Marker." The fabric was then passed through the padding solution and rolls twice. The padder was adjusted for 100% wet pick-up. The fabric was then placed on a frame so as to hold it to the dimensions it possessed before impregnation and dried in a hot air oven at 180° F. The fabric was then cured at a temperature of 300° F. for 5 minutes. After one light hand wash the treated sample showed a warp-wise shrinkage of 3.7% as contrasted with a shinkage of 8.5% for the original untreated shirting material washed under the same conditions. The chlorine retention of the treated sample, when tested according to the American Association of Textile Chemists and Colorists tentative method 69–52 (see p. 88 of the 1952 edition of the A. A. T. C. C. Yearbook), was substantially zero.

A considerable body of both theoretical and practical literature has been built up around the use of formaldehyde and polymers thereof in order to limit shrinkage and dimensional control of cellulosic fibers. Dimensional control has been usually obtained at the expense of fabric strength, i. e. considerable tendering accompanies such treatment.

The use of formalin solution has never been widely accepted because of the difficulty of adequate control of the procedure and the volatility of the formaldehyde. This factor alone militates against wide use because irritating and harmful vapors are present and released during the entire process, and considerable loss of formaldehyde content occurs.

It is well known in the art to treat cellulosic materials, for purposes of dimensional control, to stabilize same against progressive dimensional shrinkage under repeated washings, with water-soluble urea or melamine formaldehyde condensates in the presence of acidic or potentially acidic catalysts. It is also well known to apply free aldehydes, such as formaldehyde and glyoxal to cellulosic materials in the presence of acidic catalysts in order to achieve dimensional control.

It is a well-known and well-recognized fact that the urea and melamine condensates possess inherent disadvantages which limit their field of usefulness. For example, some of these products emit objectionable odors during their application to textile materials and in certain cases these odors may persist in the finished fabric. In other instances objectionable odors may develop in the fabric after finishing. Some of these condensates bring about considerable tendering and embrittlement of the fibers, thereby lowering the fabric tensile strength. These condensates also possess the unfortunate property of retaining chlorine. Thus, fabric treated with these condensates and subsequently bleached during laundering with chlorine-containing bleaches, will retain this chlorine and release it as hydrochloric acid when the fabric is ironed. This hydrochloric acid seriously tenders the fabric to the extent that these urea and melamine formaldehyde condensates cannot be applied to white or pastel shades which may be bleached during laundering. Furthermore, it has been observed that the degree of durability to laundering obtained through the use of these condensates is rather limited.

It is also well known in the art to use combinations of either water-soluble cellulosic polymers or polyvinyl alcohol with formalin to achieve dimensional control. The same drawbacks in the use of formalin apply to these processes. Use of the products of the present invention overcomes the foregoing difficulties by providing a process in which no objectionable odors are generated. The tendency toward tendering of the fabric is reduced. The agents used can be readily applied and controlled. The resulting treated textile materials are also non-chlorine retentive.

As heretofore indicated, any of the water-soluble or water-dispersible products of this invention may be applied to celluosic textiles for the purpose of stabilizing them to laundering. The term "cellulose material" includes filaments and fibers, staple or yarns, whether in finished stages or at some intermediate stage in the production thereof, of the group consisting of natural cellulose, regenerated cellulose, such as viscose rayon, cuprammonium rayon and hydrolyzed cellulose acetate, and mixtures thereof with other natural and synthetic fibers, such as celluose acetate, nylon, wool, etc. The term also includes fabrics, whether knitted, woven or felted, as well as garments or other articles made from such fabrics. The term also includes paper, paper fibers, regenerated cellulose films, jute, hemp and the like.

The applicability of the products of my invention to cellulosic textiles is contingent, in part, upon the nature of the catalyst selected. Thus, in order to reduce tensile strength damage from the effect of heated catalyst on the goods, I prefer to use magnesium chloride when applying the products of this invention to cotton. On the other hand, when viscose rayon is involved, the catalyst of preference is a 1 to 4 mixture by weight of zinc chloride and diglycolic acid. The following example shows the use of this last catalyst combination in conjunction with a tridecyl alcohol modified polyformal.

*Example 24*

A tridecyl alcohol product was prepared by the method of Example 5, using a tridecyl alcohol: diethylene glycol: paraformaldehyde weight ratio of 20: 95.4: 31.4. The light straw-colored liquid water-dispersible product was used to impregnate a piece of rayon challis in a padding roll. The fabric was then dried under tension at 180° F. and cured in a circulating air oven at 315° F. for 5 minutes. The results in the table below clearly indicate its usefulness as a dimensional control agent for cellulosic fabric.

| Treatment | 15% of product of this example. | None. |
|---|---|---|
| Catalyst | 3% $ZnCl_2$ Diglycolic acid mixture (1:4). | Do. |
| Warp Shrinkage after 1 212° F. Wash [1] | 0.0% | 7.4%. |
| Warp Tensile Strength, after 1 212° F. Wash.[2] | 54.2 lbs | 58.8 lbs. |
| Crease Recovery (Total Monsanto readings).[3] | 275° | 219°. |

[1] American Association of Textile Chemists and Colorists Yearbook (1953), p. 140.
[2] A. S. T. M. Specifications D39–49 (1955).
[3] Ibid., p. 165.

The product of Example 2 may also be used as in the above example for similar results.

The general application of these modified polymeric acetals involves padding cellulosic fabric through aqueous solutions or dispersions of the polymeric acetals containing from 0.5 to 25% by weight of the acetal. The padding bath must contain, in addition to the acetal, some acidic-type catalyst, such as aluminum chloride, stannic chloride, aluminum sulfate, oxalic acid, zinc chloride, sodium acid sulfate, sodium or potassium alum, dimethyl oxalate, ammonium chloride, etc., in amount of about 5% to about 200% by weight of the acetal content. The treated fabric may then be dried at an appropriate temperature and subsequently cured at a temperature which will usually be at least 250° F. for about ½ to 10 minutes. The time of cure varies inversely with the temperature. The cured fabric may then be washed lightly with a detergent and a mild alkali, rinsed thoroughly and dried in a relaxed state. Fabrics so treated with these acetals will not undergo progressive shrinkage even when laundered in boiling soap solution as in American Association of Textile Chemists and Colorists (A. A. T. C. C.) 1952 Standard Test Method 14-52 for cotton and linen fabrics.

The products of this invention may also be used according to the method of copending application Serial No. 411,542, filed February 19, 1954, now Patent 2,785,947, March 19, 1957, to produce durable mechanical effects on cellulosic fabrics. Embossed, glazed, shreinered, moiré, and various other effects obtained by modifying the surface appearance of a cellulosic textile material by applying pressure thereto can be made durable to laundering by applying the products of this invention in an aqueous bath and then carrying out physical modification of the surface appearance and curing under suitable conditions of catalyst, time and temperature to cause reaction between my polyacetals and the cellulosic goods while in their physically modified condition. Appropriate conditions for this process are described in the above-mentioned copending application.

The modified polyacetals of this invention may also be used to improve the wet strength and dimensional stability of cellulose paper fibers and regenerated cellulose films by impregnating such fibers or films at any stage in their manufacture with an aqueous solution thereof and curing under catalytic conditions in accordance with the process of my copending application Serial No. 508,318, filed May 13, 1955.

Another application of the water-soluble condensation products of this invention is in the promotion of level dyeing. For this use I prefer to employ polyacetals modified with monohydric alcohols containing from 8 to 18 carbon atoms in their molecule. Alkaryloxyalkanols of corresponding molecular weight may also be used to modify polyacetals used for this purpose. Thus, the product of Example 12 when used in 0.1% concentration gave rise to markedly superior level dyeing of direct colors on cotton fabric.

When it is desired to produce condensation products which possess wetting properties, it is advantageous to prepare my modified polyacetals by utilizing higher aliphatic alcohols having from 10 to 18 carbon atoms as shown in Table I. The relative wetting speeds in seconds at 100° F. of various products prepared as in Example 3 (using each higher alcohol in an amount molecularly equivalent to the lauryl alcohol of that example) were determined by the Draves Test according to the American Association of Textile Chemists and Colorists Yearbook 29, pp. 156-7 (1953). These products were made by reacting diethylene glycol, paraformaldehyde and an alcohol and wetting times as listed in the following Table I:

TABLE I

| Fatty Alcohol Used | Wetting Speed 0.2% Solids Conc., seconds |
| --- | --- |
| n-Decanol | 13 |
| Lauryl alcohol | 17 |
| Tridecyl alcohol | 10 |

The compounds of Table I compare favorably with commercial wetting agents presently available, such as alkylphenol reaction products of ethylene oxide.

By contrast, wetting speeds at 0.2% concentration of polyformals of a nature similar to those listed in Table I, but modified with equimolar amounts of 2-ethylhexanol and nonyl alcohol, instead of with the higher alcohols shown there, were 106 seconds and over 300 seconds respectively. Thus, it is evident that a minimum chain length of 10 carbon atoms is desirable when monohydric alcohols are to be used to modify polyacetals destined for service as wetting agents.

Some of the products made in accordance with this invention have considerable utility as non-foaming emulsifiers. Thus, the product of Example II showed the following foaming characteristics using the Ross-Miles test at 100° F., 0.4% solids, (Oil and Soap, vol. 18.99, 1941).

TABLE II

| Product | Height of Foam after 5 Seconds, mm. |
| --- | --- |
| Product of Example 11 | 8 |
| Commercial surfactant (Substituted phenol ethylene oxide condensate) | 150 |

A product such as that of Example III is useful in preparing stable emulsions. It is known that silicones are difficultly emulsifiable. However, the formulation in the following example gave rise to a stable silicone emulsion:

*Example 25*

| | Parts |
| --- | --- |
| Commercial alkyl hydrogen silanol polymer | 60 |
| Condensation product of Example 11 | 5 |
| Water | 85 |

The silicone was slowly added to a rapidly agitated solution of a portion of the water and the condensation product. When the silicone was completely dispersed the remainder of the water was added and the emulsion homogenized in a hand homogenizer. This gave rise to a stable emulsion.

Products made in accordance with this invention are useful as rewetting softeners as illustrated by Example 26.

*Example 26*

A 0.30% dispersion in water of the product of Example 5 was tested for rewetting properties as follows: five squares of canvas duck were dropped into the solution at 120° F.: they sank to the bottom in 4 seconds. The squares were removed, dried and dropped into tap water at 120° F.: the squares sank in 10 seconds. When dropped into tap water untreated canvas required 2 minutes to sink. In addition, the product caused considerable softening of cotton sheeting when applied in small concentrations and dried.

Table III shows detersive properties of three alkyl modified diglycol polyformals prepared by methods comparable to that of Example 3. In this table, the composition of the detergent is given in terms of molar ratios of the diglycol and formaldehyde used per mole of higher aliphatic alcohol. Percent cleaning was calculated from Hunter reflectometer readings by the method of Kubelka and Munk (see E. I. du Pont de Nemours & Co., Inc., "Technical Service Bulletin," Chemical and Miscellaneous Sales, Explosives Dept., Number 3A, February 1948) using a soil prepared from 84 gms. of hydrogenated fat ("Crisco"), 56 gms. of refined white oil ("Nujol"), 2.1 gms. of lamp black and 700 ccs. of carbon tetrachloride.

TABLE III—DETERGENCY OF ALKYL POLYFORMALS VS. SOILED COTTON

[Launderometer. 30 mins. at 120° F. 20 steel balls. 300 ccs. solution. 0.1% soda ash.]

| Hydrophobe | Hydrophile (Moles/mole hydrophobe) | Percent Detergent | Percent Cleaning |
|---|---|---|---|
| Tridecyl alcohol (oxo process). | 4 diethylene glycol / 4.4 formaldehyde | 0.05 | 63.5 |
| Same | Same | 0.1 | 72.5 |
| Same | 6.75 diethylene glycol / 1.5 dipropylene glycol / 9.0 formaldehyde | 0.05 | 60.0 |
| Same | Same | 0.1 | 73.0 |
| Same | 10 diethylene glycol / 11 formaldehyde | 0.05 | 61.0 |
| Same | Same | 0.1 | 72.0 |
| Tetradecyl alcohol | 8 diethylene glycol / 8.8 formaldehyde | 0.05 | 63.0 |
| Commercial non-ionic detergent: Alkyl phenol-ethylene oxide condensate | | 0.05 | 64.5 |
| Same | | 0.1 | 68.5 |

The acetals herein described are useful as hydraulic fluids in hydraulically operated apparatus, either alone or in conjunction with a suitable glycol or glycol ether, with or without corrosion preventatives or other adjuvants.

It is to be understood that numerous condensation products of the present invention may be made using a great variety of components and mixtures of each type of component as previously explained, which are intended to be included within the scope of the appended claims.

I claim:

1. A water-soluble polymeric acetal condensation product having wetting properties comprising the reaction product of a polyalkylene glycol in which the alkylene radical has from 2 to 4 carbon atoms in a straight chain, a monohydric alcohol having a reactive hydroxyl radical selected from the group consisting of monohydric alcohols and glycol monoethers containing from 10 to 18 carbon atoms, and an aliphatic aldehyde containing from 1 to 8 carbon atoms in monomeric form in amount of said alcohols, said reactants being heated in the presence of an acidic catalyst under reflux conditions to remove about 1 mole for each 2 moles of hydroxyl radical of water of reaction to obtain a water-soluble polymeric acetal condensation product, said condensation product containing per molecule at least two polyoxyalkylene radicals derived from said glycol and at least two alkylidene radicals derived from said aldehyde.

2. A water-soluble polymeric acetal condensation product having wetting properties comprising the reaction product of diethylene glycol, tridecyl alcohol and formaldehyde in amount of about 1 mole for each 2 moles of hydroxyl radical of the said alcohols, said reactants being heated in the presence of an acidic catalyst under reflux conditions to remove water of reaction to obtain a water-soluble polymeric acetal condensation product, said condensation product containing per molecule at least two polyoxyalkylene radicals derived from said glycol and at least two alkylidene radicals derived from said aldehyde.

3. A water-soluble polymeric acetal condensation product having wetting properties comprising the reaction product of diethylene glycol, lauryl alcohol and formaldehyde in amount of about 1 mole for each 2 moles of hydroxyl radical of the said alcohols, said reactants being heated in the presence of an acidic catalyst under reflux conditions to remove water of reaction to obtain a water-soluble polymeric acetal condensation product, said condensation product containing per molecule at least two polyoxyalkylene radicals derived from said glycol and at least two alkylidene radicals derived from said aldehyde.

References Cited in the file of this patent
UNITED STATES PATENTS

| 2,321,542 | Brooks | June 8, 1943 |
| 2,786,081 | Kress | Mar. 19, 1957 |

---

UNITED STATES PATENT OFFICE
CERTIFICATE OF CORRECTION

Patent No. 2,878,294           March 17, 1959

Bernard H. Kress

It is hereby certified that error appears in the printed specification of the above numbered patent requiring correction and that the said Letters Patent should read as corrected below.

Column 4, line 69, for "surfacetant" read -- surfactant --; column 5, line 75, for "remains such" read -- remains which --; column 6, line 59, after "butane" strike out the comma; column 8, line 4, for "products" read -- product --; column 14, line 15, for "Example II" read -- Example 11 --; line 30, for "Example III" read -- Example 11 --; column 16, line 4, strike out "about 1 mole for each 2 moles of hydroxyl radical of" and insert the same after the words "amount of" in line 1, and before "said alcohols," in line 2, same column.

Signed and sealed this 14th day of July 1959.

(SEAL)
Attest:

KARL H. AXLINE                                   ROBERT C. WATSON
Attesting Officer                                Commissioner of Patents

UNITED STATES PATENT OFFICE
CERTIFICATE OF CORRECTION

Patent No. 2,878,294                                                    March 17, 1959

Bernard H. Kress

It is hereby certified that error appears in the printed specification of the above numbered patent requiring correction and that the said Letters Patent should read as corrected below.

Column 4, line 69, for "surfacetant" read -- surfactant --; column 5, line 75, for "remains such" read -- remains which --; column 6, line 59, after "butane" strike out the comma; column 8, line 4, for "products" read -- product --; column 14, line 15, for "Example II" read -- Example 11 --; line 30, for "Example III" read -- Example 11 --; column 16, line 4, strike out "about 1 mole for each 2 moles of hydroxyl radical of" and insert the same after the words "amount of" in line 1, and before "said alcohols," in line 2, same column.

Signed and sealed this 14th day of July 1959.

(SEAL)
Attest:

KARL H. AXLINE                                                          ROBERT C. WATSON
Attesting Officer                                                 Commissioner of Patents